United States Patent
Baba et al.

(10) Patent No.: US 7,899,274 B2
(45) Date of Patent: Mar. 1, 2011

(54) CONTENT SEARCH METHOD AND APPARATUS

(75) Inventors: Takayuki Baba, Kawasaki (JP); Susumu Endo, Kawasaki (JP); Shuichi Shiitani, Kawasaki (JP); Yusuke Uehara, Kawasaki (JP); Shigemi Nagata, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1057 days.

(21) Appl. No.: 11/703,959

(22) Filed: Feb. 8, 2007

(65) Prior Publication Data

US 2008/0089553 A1    Apr. 17, 2008

(30) Foreign Application Priority Data

Oct. 17, 2006    (JP) .............................. 2006-282519

(51) Int. Cl.
G06K 9/60    (2006.01)
G06K 9/00    (2006.01)
G06K 9/62    (2006.01)
G06K 9/68    (2006.01)
G05B 13/02    (2006.01)
G06F 12/00    (2006.01)
G06F 17/30    (2006.01)

(52) U.S. Cl. ................ 382/305; 382/115; 382/128; 382/155; 382/181; 382/224; 382/225; 382/226; 382/306; 700/47; 707/821

(58) Field of Classification Search .............. 382/305
See application file for complete search history.

(56) References Cited

U.S. PATENT DOCUMENTS 6,121,969 A * 9/2000 Jain et al. ................. 715/850
6,798,898 B1 * 9/2004 Patton et al. .............. 382/128
6,804,683 B1   10/2004 Matsuzaki et al.
7,236,652 B2 * 6/2007 Kasutani ................... 382/305

OTHER PUBLICATIONS

Cox et al., "Functional magnetic resonance imaging (fMRI) "brain reading": detecting and classifying distributed patterns of fMRI activity in human visual cortex", NeuroImage 19, 2003, pp. 261-270.*

Thirion et al., "Inverse retinotopy: Inferring the visual content of images from brain activation patterns", NeuroImage 33, 2006, pp. 1104-1116.*

Haynes et al., "Decoding mental states from brain activity in humans", Neruoscience Nature Reviews, vol. 7, Jul. 2006, pp. 523-534.*

(Continued)

Primary Examiner—Brian Q Le
Assistant Examiner—Jose M Torres
(74) Attorney, Agent, or Firm—Fujitsu Patent Center

(57) ABSTRACT

This invention is to enable retrieving of a content the searcher imagines in mind. The search method includes: obtaining a query brain image representing a brain activity state of a searcher when perceiving or imagining the content to be retrieved; identifying the content corresponding to the query brain image by using a structure associating a content with a brain image representing the brain activity state when perceiving the content; and outputting the content corresponding to the query brain image. Thus, by using the query brain image, without specifically indicating the content such as a drawing, the searcher can extract the pertinent content only by imaging the content.

18 Claims, 13 Drawing Sheets

OTHER PUBLICATIONS

Kay et al., "Identifying natural images from human brain activity", Nature, vol. 452, Mar. 2008, pp. 352-356.*

Gallant et al., "Bayesian Reconstruction of Perceptual Experiences from Human Brain Activity", D.D. Schmorrow et al. (Eds.): Augmented Cognition, HCII 2009, LNAI 5638, pp. 390-393.*

Baba et al.; "A shaped-based part retrieval method for mechanical assembly drawings"; Technical report of IEICE, The Institute of Electronics, Information and Communication Engineers; PRMU2004-225, pp. 79-84; 2005.

Liu et al.; "Attributed Graph Matching based Engineering Drawings Retrieval"; Proc. of IAPR Workshop on Document Analysis Systems (DASO4); pp. 378-388; Sep. 2004.

Liu et al.; "Component Parts Extraction from Assembly Drawings for Content based Retrieval"; Proc. of the IEE Int'l. Conference on Visual Information Engineering: Convergence in Graphics and Vision (VIE2005); pp. 45-50- Apr. 2005.

Baba et al.; "Similarity-based Partial Image Retrieval System for Engineering Drawings"; Proc. of Seventh IEEE Int'l. Symposium on Multimedia (ISM2005); pp. 303-309; Dec. 14, 2005.

ATR and Honda succeeded in development of basic technique to operate robot by brain; http://www.honda.co.jp/news/2006/c060524a.html; May 24, 2006.

Kamitani et al.; "Decoding the visual and subjective contents of the human brain"; Nature Neuroscience, vol. 8, No. 5; pp. 679-685; May 2005.

Uehara et al.; "Computer-aided Knowledge Discovery from Images Based on Information Visualization in a 3-D Virtual Space"; Study Material of the Japanese Society for Artificial Intelligence; SIG-FAI/KBS-J; pp. 243-250; 2001.

* cited by examiner

| USER ID | BRAIN IMAGE ID | REGISTERED DRAWING ID |
|---|---|---|
| A | 00001 | f00001 |
| A | 00002 | f00002 |
| B | 00003 | f00003 |
| C | 00004 | f00004 |
| ⋮ | ⋮ | ⋮ |

| USER ID | BRAIN IMAGE ID | REGISTERED DRAWING ID | CLUSTER ID |
|---|---|---|---|
| A | 00001 | f00001 | a |
| B | 00002 | f00002 | a |
| C | 00003 | f00003 | b |
| D | 00004 | f00004 | b |
| ⋮ | ⋮ | ⋮ | ⋮ |

| MULTIPLE-COMPONENT DRAWING ID | SINGLE-COMPONENT DRAWING ID |
|---|---|
| 00001 | 00001-01 |
| 00001 | 00001-02 |
| 00002 | — |
| 00003 | 00003-01 |
| 00003 | 00003-02 |
| 00003 | 00003-03 |
| ⋮ | ⋮ |

STUDY PHASE

IMAGE FEATURE QUANTITY
OF REGISTERED DRAWING

⇩

NEURAL
NETWORK

⇩

CORRESPONDING
BRAIN IMAGE

PREDICTION PHASE

IMAGE FEATURE QUANTITY
OF QUERY DRAWING

⇩

⇩

QUERY BRAIN IMAGE

STUDY PHASE

BRAIN IMAGE

⇩

NEURAL
NETWORK

⇩

REGISTERED DRAWING

PREDICTION PHASE

QUERY BRAIN IMAGE

⇩

⇩

DRAWING

CONTENT SEARCH METHOD AND APPARATUS

TECHNICAL FIELD OF THE INVENTION

This invention relates to a technique for retrieving contents including a drawing, video, image, three-dimensional Computer Aided Design (3D-CAD) data, volume data and the like (e.g. entity that can be perceived by the sense of sight, hearing, taste, touch or smell).

BACKGROUND OF THE INVENTION

In the industry, in order to develop the product having the competitiveness and early bring it to market, it is desired to effectively utilize the technical resources such as drawings of the existing products. A technique to efficiently retrieve drawings in which necessary components are drawn is required in order to find out necessary information from among a large volume of drawings, which have been accumulated up to now. Then, as a simple method, a text-based search is frequently used, in which a keyword such as a component name assigned to the drawing is input. In addition, recently, in order to realize a search using the shape of the component, which is difficult to represent it by the text, a similar shape search using shape information of the component drawn in the drawing is being used.

On the other hand, a following study is reported. Specifically, when a subject plays janken, a Magnetic Resonance Imaging (MRI) apparatus measures changes of the blood flow according to the brain activity for each second, and the computer extracts only portion relating to action commands of the brain activity from its image to analyze and interpret which action in the janken is played. The computer sends the result to a robot hand to cause it to perform the same action as the subject plays. However, the study does not mention the search for the contents, which concretely exist.

However, in the conventional similar shape search techniques, the shape information extracted from the drawing is a shape feature quantity predefined by a system developer, and according to a query drawing designated by a searcher, there is a case where any similar result expected by the searcher cannot be obtained. This is because an appropriate shape feature quantity along the intention of the searcher cannot be always obtained by a predetermined extraction method of the shape feature quantity used in the search.

In addition, although it is necessary to prepare a query drawing, there are a lot of cases where there is no appropriate query drawing in hand. In such a case, although it is considered that the searcher draws the component he or she would like to find out by a sketch input or the like, it is often difficult to draw the component the searcher images in mind as he or she wants by the sketch.

SUMMARY OF THE INVENTION

Therefore, an object of this invention is to provide a new technique to retrieve the contents.

In addition, another object of this invention is to provide a new technique to enable the retrieval of the contents the searcher images in mind.

Furthermore, still another object of this invention is to provide a new technique to enable the searcher to retrieve the contents more easily.

A search method for retrieving a content the human being can perceive according to a first aspect of this invention includes: obtaining a query brain image representing a brain activity state of a searcher when perceiving or imagining the content to be retrieved; identifying the content corresponding to the query brain image by using a structure associating a content with a brain image representing the brain activity state when perceiving the content; and outputting the content corresponding to the query brain image.

Thus, by using the query brain image, without specifically indicating the content such as drawing, the searcher can extract the pertinent content only by imaging the contents. That is, it becomes possible to easily carry out the retrieval of the content.

In addition, the aforementioned structure may be a database storing a DB brain image representing the brain activity state when perceiving the content in association with the content. In such a case, the aforementioned identifying may include: searching the database by the query brain image to identify the DB brain image having predetermined similarity with the query brain image; and identifying the content corresponding to the identified DB brain image from the database. Thus, by preparing the DB brain image in association with the content in advance, it becomes possible to identify the image similarity between the DB brain image and the query brain image.

Furthermore, the aforementioned predetermined similarity may be determined based on a difference between density of a pixel of the DB brain image and density of a corresponding pixel of the query brain image or a difference between density of a pixel of a portion of the query brain image and density of a corresponding pixel of the DB brain image.

Furthermore, the aforementioned predetermined similarity may be determined based on a distance between a feature quantity of the DB brain image and a feature quantity of the query brain image.

In addition, a user ID of a user whose DB brain image was measured may be associated with the DB brain image in the aforementioned database. In such a case, the aforementioned identifying may include narrowing the DB brain images by the user ID of the searcher in the database. This is because the brain image may be different when the searcher is different.

Furthermore, the aforementioned identifying may further include, when the DB brain image having the predetermined similarity cannot be extracted from the narrowed DB brain images, searching the database regardless of the user ID of the searcher or by using the user ID other than the user ID of the searcher.

In addition, a user ID of a user whose DB brain image was measured may be registered in association with the DB brain image in the database. Furthermore, the DB brain image may be clustered for each user ID. In addition, each cluster may include a test registration brain image representing the brain activity state of a pertinent user when perceiving a test content. Then, in such a case, the first aspect of this invention may further include: obtaining a test brain image representing the brain activity state of the searcher when perceiving the test content; and comparing the test brain image with the test registration brain image for each cluster, which is stored in the database, to identify the cluster to which the test brain image belongs. Furthermore, in such a case, the aforementioned identifying may include narrowing the DB brain images by the cluster to which the test brain image belongs in the database. When there is a predetermined tendency in the brain image, the more appropriate content can be extracted by introducing such clusters.

In addition, the first aspect of this invention may further include registering, in the database, the query brain image in association the content identified as the retrieval result for the query brain image. In addition, the first aspect of this invention may further include registering, in the database, the test brain image in association with the test content. In order to reuse the query brain image or test brain image, these steps are introduced.

Furthermore, the aforementioned content may be a single drawing. In such a case, the search method according to the first aspect of this invention may further include: identifying, by a data structure managing combinations of a drawing that is the content and a drawing including the specific drawing, a combination for a drawing that is the content identified at the identifying. Then, the aforementioned outputting may include attaching a mark to the drawing identified at the identifying to output the identified combination. When plural drawings are integrated, the pertinent portion can be presented for the searcher.

Furthermore, the aforementioned identifying may further include sorting the DB brain images having the predetermined similarity with the query brain image in a descending order based on the similarity degree of the identified DB brain images. In addition, the aforementioned outputting may include outputting the content corresponding to the query brain image in an order of the sorting. Furthermore, the search method according to the first aspect of this invention may include obtaining a second query brain image of the searcher at a timing designated by the searcher or at an arbitrary timing; and carrying out the identifying and the outputting for the second query brain image. By this processing, it becomes possible to narrow the contents much similar to the contents the searcher imagines in mind.

In addition, the aforementioned obtaining may include inputting a feature quantity of the content to be retrieved into a neural network in which the study is carried out by using a feature quantity of a content as input data and using, as output data, a brain image representing the brain activity state when perceiving the content to obtain a corresponding brain image. When the content to be retrieved or similar content is held, the retrieval can be easily carried out.

In addition, the aforementioned structure may be a neural network in which the study is carried out by using a brain image as input data and using a content corresponding to the brain image as output data.

A search apparatus for retrieving a content the human being can perceive according to a second aspect of this invention includes: an obtaining unit that obtains a query brain image representing a brain activity state of a searcher when perceiving or imagining a content to be retrieved; an identifying unit that identifies a content corresponding to the query brain image by using a structure associating a brain image representing a brain activity state when perceiving a content with the content; and an output unit that outputs the content corresponding to the query brain image.

In addition, the aforementioned structure may be a database storing the DB brain image representing the brain activity state when perceiving the content in association with the content. In such a case, the aforementioned identifying unit may search the database by the query brain image, identify the DB brain image having predetermined similarity with the query brain image, and identify the content corresponding to the identified DB brain image from the database.

Furthermore, a user ID of a user whose DB brain image was measured may be registered in association with the DB brain image in the database. Then, the DB brain images may be clustered for each user ID. Furthermore, each cluster may include a test registration brain image representing the brain activity state of a pertinent user when perceiving a test content. In such a case, the search apparatus according to the second aspect of this invention may further include a unit that identifies a content to which the most users register the DB brain image by searching the database or a predetermined content, as the test content. Furthermore, the aforementioned obtaining unit may obtain the test brain image representing the brain activity state of the searcher when perceiving the test content, and the aforementioned identifying unit may compare the test brain image with the test registration brain image for each cluster, which is stored in the database, and identify the cluster to which the test brain image belongs to narrow the DB brain images by the cluster to which the test brain image belongs in the database. This processing is carried out in order to carry out an accurate retrieval by carrying out an appropriate clustering.

Furthermore, the second aspect of this invention may further include: a unit that registers, when a plurality of contents having similarity equal to or more than a predetermined reference are detected, one brain image in association with the plurality of contents into the database. Thus, because it is necessary to measure the brain image only once for the extremely similar drawings or the like, the workload can be reduced when accumulating the data.

Furthermore, the search apparatus according to the second aspect of this invention may further include a unit that presents an arrangement of the DB brain images based on feature quantities of corresponding contents for a user; a unit that presents the contents in the same arrangement as the arrangement of the DB brain images for the user; and a unit that registers a relation between the contents and the DB brain images, which are specified by the user, into the database.

Similarly, the second aspect of this invention may further include: a unit that presents an arrangement of the DB brain images based on feature quantities of the DB brain images for a user; a unit that presents corresponding contents in the same arrangement as the arrangement of the DB brain images for the user; and a unit that registers a relation between the contents and the DB brain images, which are specified by the user, into the database. Thus, it becomes possible to register new data into the database and utilize it for the new search.

Incidentally, it is possible to create a program for causing a computer to execute the search method according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

DETAILED DESCRIPTION OF THE PREFERRED EMBODIMENTS

Outline of Embodiment of this Invention

Figures 1, 3:
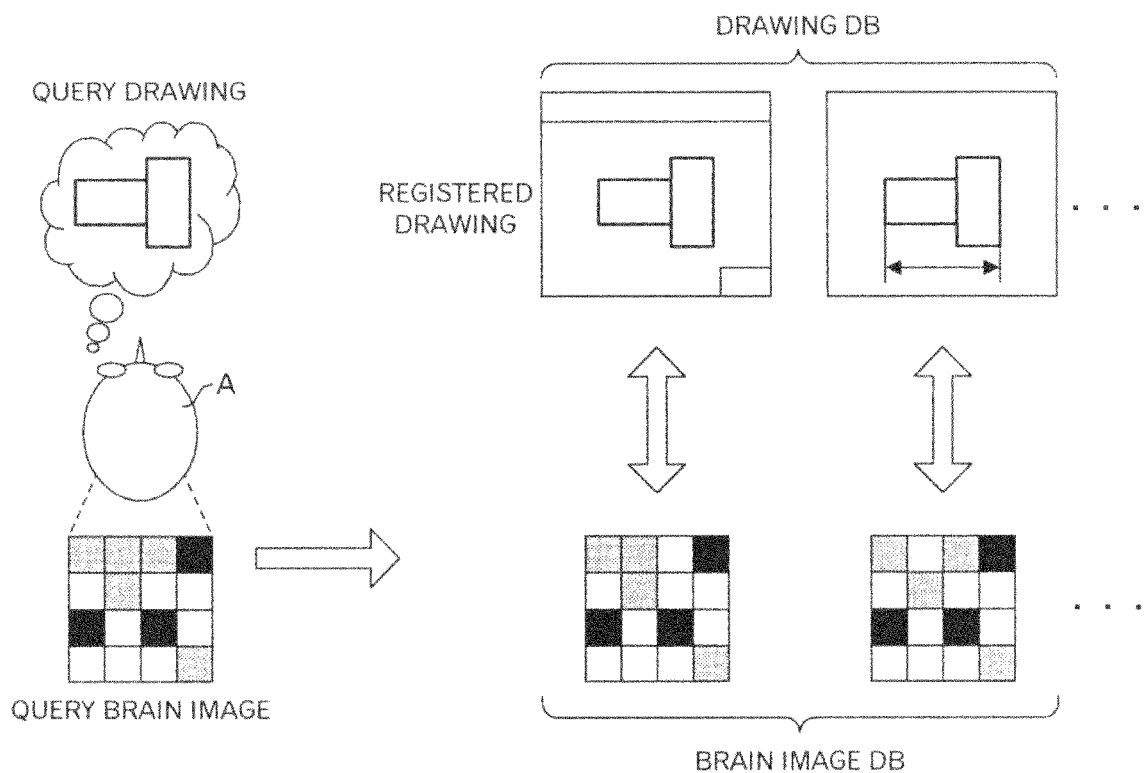
FIG. 1 is a diagram showing an outline of an embodiment of this invention.
FIG. 3 is a diagram showing a data example managed in a brain image DB.

First, an outline of an embodiment of this invention will be explained. In this embodiment, by using the similarity of brain images (e.g. two-dimensional image, three-dimensional image, time sequence images or the like) of a searcher, which are measured by an apparatus measuring a brain activity area such as a functional Magnetic Resonance Imaging (fMRI) apparatus or optical topography apparatus, a search apparatus for retrieving the content the human being can perceive is configured. By this technique, without creating a query drawing the searcher imagines by the sketch, it becomes possible to retrieve the drawing by using the brain image when the searcher imagines the query drawing. In the following, an example of retrieving the drawing will be explained.

In this embodiment, as a preprocessing, as shown in the right side of FIG. 1, brain images (called DB brain images) are measured when the searcher visually checks individual registered drawings in a drawing database (DB), and the DB brain images are registered in association with the registered drawings into a brain image DB. Then, when the search is carried out, as shown in the left side of FIG. 1, a brain image (called a query brain image) is measured to input the query brain image as a query, when a searcher A visually checks a query drawing or imagines the query drawing without visually checking the query drawing. Then, the degree of the similarity between the query brain image and each of the DB brain images is calculated, and a DB brain image having predetermined similarity with the query brain image is identified to output the drawing corresponding to the identified DB brain image.

Embodiment 1

Figures 2, 5:
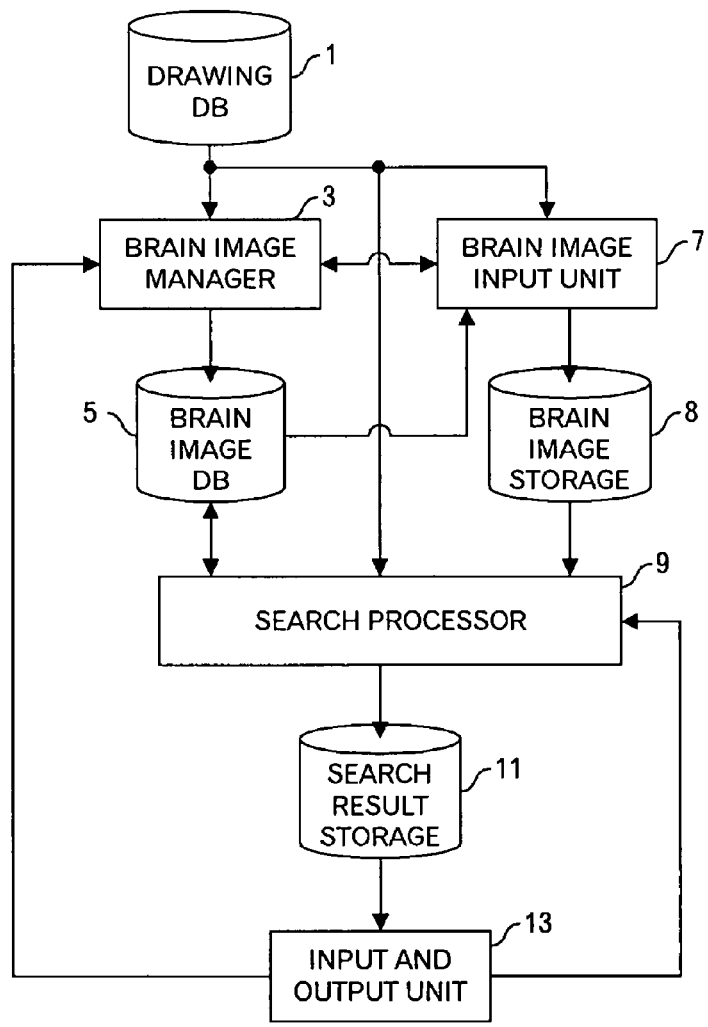
FIG. 2 is a functional block diagram of a search apparatus in the embodiment of this invention.
FIG. 5 is a diagram showing a data example managed in the brain image DB.

FIG. 2 shows a search apparatus according to this embodiment of this invention. The search apparatus has a drawing DB 1 that stores drawings as an example of the contents; a brain image manager 3 that carries out a processing to associate a drawing with a brain image, which is measured when the drawing is visually checked and represents the brain activity state; a brain image DB 5 that stores a brain image and association data with the drawing; a brain image input unit 7 that obtains a query brain image for the query or a DB brain image corresponding to a registered drawing; a brain image storage 8 that stores the brain image obtained by the brain image input unit 7; a search processor 9 that carries out a search of the brain image DB 5 by the query brain image stored in the brain image storage 8 and extracts a pertinent drawing data from the drawing DB 1; a search result storage 11 that stores the search result of the search processor 9; and an input and output unit 13 that outputs the search result stored in the search result storage 11 to the searcher and accepts a selection instruction from the searcher.

The brain image input unit 7 refers to the drawing DB 1 or the brain image DB 5 to identify a test drawing or the like and also carries out a processing to present it for the user. In addition, in order to register the query brain image into the brain image DB 5 in association with a drawing selected by the searcher, the input and output unit 13 outputs drawing selection instruction data by the searcher to the brain image manager 3, and outputs an instruction to register the query brain image into the brain image DB 5 to the search processor 9.

The brain image DB 5 also holds data as shown in FIG. 3 in addition to the brain images themselves. Specifically, FIG. 3 shows a table to register the relation between a brain image ID and a registered drawing ID. By holding such data, it becomes possible to identify a corresponding drawing from the DB brain image. The brain image manager 3 identifies which drawing in the drawing DB 1 is output when registering the DB brain image, and registers a drawing ID of the identified drawing in association with a brain image ID of the DB brain image, which was input in association with the drawing, into the brain image DB 5.

Next, a processing flow of the search apparatus shown in FIG. 2 will be explained by using FIG. 4. First, the brain image input unit 7 obtains a query brain image representing the brain activity when the searcher visually checks the drawing to be retrieved or when he or she imagines the drawing to be retrieved, and stores the query brain image into the brain image storage 8 (step S1). As for the query brain image, the entire brain image may be used, and only a pre-specified active area may be used. When only a portion of the brain image is used, only a corresponding portion of the DB brain image is used similarly.

Next, the search processor 9 identifies one unprocessed DB brain image in the brain image DB 5 (step S3). Then, the search processor 9 calculates a degree of the similarity between the query brain image and the DB brain image identified at the step S3, and stores the degree of the similarity into a storage device such as a main memory (step S5). At the step S5, for example, it is possible to calculate a difference between the density of a pixel of the query brain image and the density of a corresponding pixel of the DB brain image, and calculate, as the degree of the similarity, the total sum of the absolute values of the differences. In such a case, the less the total sum of the absolute values of the differences, the higher the degree of the similarity is. Incidentally, the differences of the pixel density may be calculated only for a portion in both of the query brain image and the DB brain image.

In addition, it is also possible that an image feature quantity of the color, shape or the like is extracted from the query brain image to generate a feature quantity vector from the image feature quantity, an image feature quantity of the color, shape, or the like is extracted from the DB brain image to generate a feature quantity vector from the image feature quantity, and the distance between these feature quantity vectors is calculated as the degree of the similarity. Also in such a case, the shorter the distance is, the higher the degree of the similarity is. Incidentally, as for the image feature quantity, a technique described in Takayuki Baba et al., "A shape-based part retrieval method for mechanical assembly drawings", the technical study report of the Institute of Electronics, Information and Communication Engineers, PRMU2004-225, pp. 79-84 (2005) can be used.

Figures 6, 7:
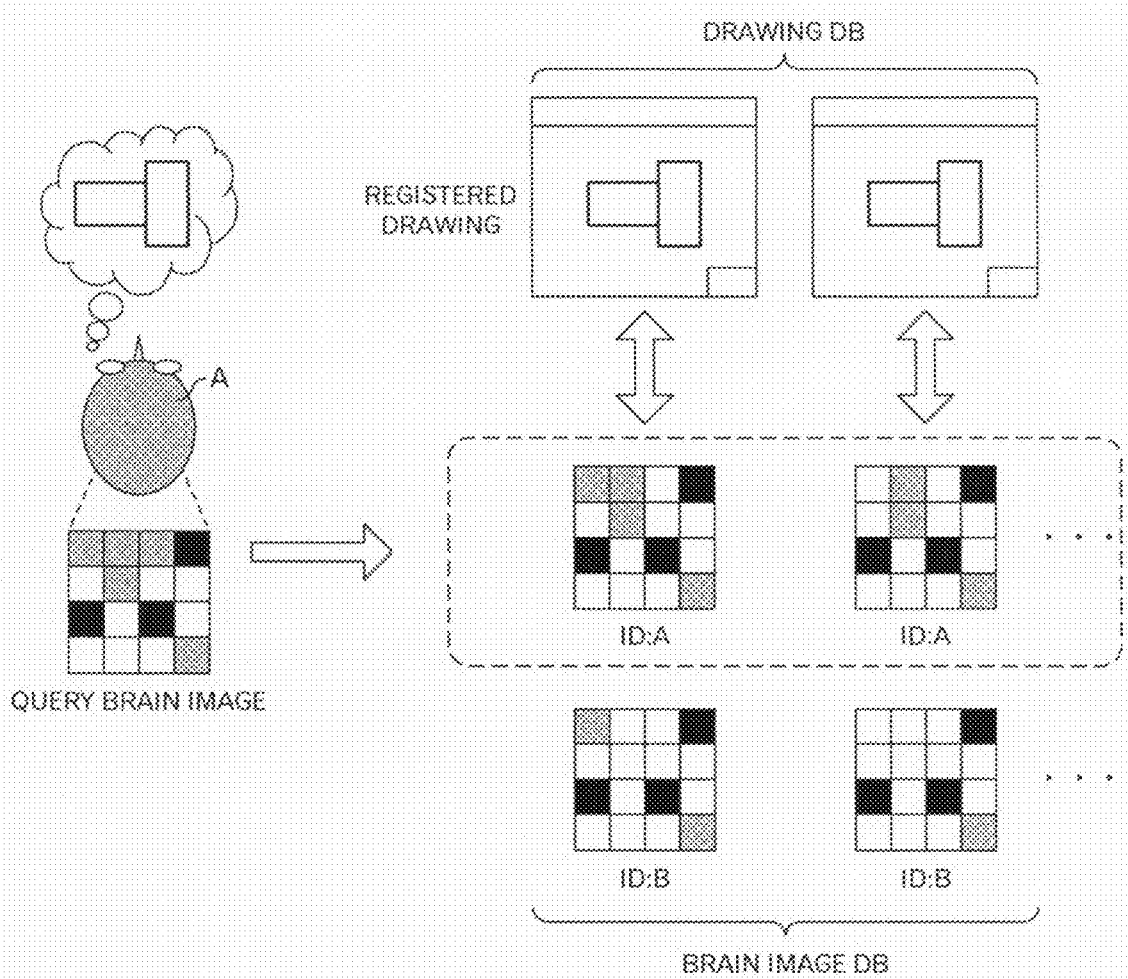
FIG. 6 is a diagram showing an example of a sorting result.
FIG. 7 is an outline diagram when the narrowing is carried out based on the user ID.

Then, the search processor 9 judges whether or not all of the DB brain images in the brain image DB 5 have been processed (step S7) When there is an unprocessed DB brain image, the processing returns to the step S3. On the other hand, when all of the DB brain image in the brain image DB 5 have been processed, the search processor 9 sorts the drawings corresponding to the DB brain images according to the data structure as shown in FIG. 3 in a descending order of the degrees of the similarity of the DB brain images (step S9). The data of the drawings is obtained from the drawing DB 1, and it is stored with the sorting result (e.g. data as shown in FIG. 6) into the search result storage 11. Incidentally, it is not necessary to obtain all of the drawing data but it is only necessary to obtain data for the top predetermined number of drawings.

The input and output unit 13 outputs the drawings in the sorting order based on the sorting result stored in the search result storage 11 (step S11). For example, the output screen includes a "next" button and a "select" button. Then, when an inappropriate drawing was displayed, the searcher clicks the "next" button. When the "next" button is clicked, the input and output unit 13 displays the next ordered drawing. When the drawing the searcher visually checked or imagined is output, the searcher clicks the "select" button. In response to the selection of the drawing, the input and output unit 13 outputs the drawing ID of the drawing to the brain image manager 3. In addition, the input and output unit 13 instructs the search processor 9 to register the query image stored in the brain image storage 8 into the brain image DB 5, and in response to the instruction, the search processor 9 registers the query brain image into the brain image DB 5. In addition, the brain image manager 3 registers the drawing ID in association with an ID of the query brain image into a table as shown in FIG. 3, for example (step S13). Thus, the query brain image can be used as the DB brain image for the later search. This enriches the brain image DB 5.

By carrying out the aforementioned processing, the drawing the searcher keeps in mind can be extracted without specifically drawing the drawing by himself or herself.

Embodiment 2

In the first embodiment, the narrowing of the DB brain images is not specifically indicated. In the second embodiment, because it is considered that the brain images are somewhat different according to the searcher, the user ID of the user whose DB brain image is measured is registered in association with the DB brain image. For example, the data as shown in FIG. 5 is registered in the brain image DB 5. Namely, a table is stored in which a user ID of a user whose DB brain image was measured, a brain image ID of the DB brain image, and a registered drawing ID of the drawing corresponding to the DB brain image are registered. The brain image manager 3 obtains the user ID of the user who carries out the measurement from the brain image input unit 7 or the like, and registers the user ID in association with the brain image ID of the DB brain image and the registered drawing ID of the drawing at that time.

Then, as for the query brain image of the searcher A whose user ID is "A", first, the comparison target is narrowed to the DB brain images to which "A" is registered as the user ID. In an example of FIG. 7, the comparison target is limited to an upper portion surrounded by a dotted line. As for the limitation of the comparison target, for example, at the step S3 of FIG. 4, an unprocessed DB brain image of the pertinent user ID is identified. However, when no DB brain image having the degree of the similarity greater than a predetermined degree can be identified from the DB brain images to which "A" is registered as the user ID, the DB brain images to which other user ID such as "B" is registered as the user ID are also used for the comparison target. This is because the kinds of drawings are limited when using only the DB brain images to which the same user ID is registered.

Thus, because the comparison is carried out along the tendency of the searcher, it becomes possible to obtain more accurate search result.

Embodiment 3

In the second embodiment, the comparison target is narrowed based on the user ID. However, because there are users having the same tendency in the brain image, it is possible to carry out a clustering based on the similarity of the brain image, not user ID.

Figures 8, 9:
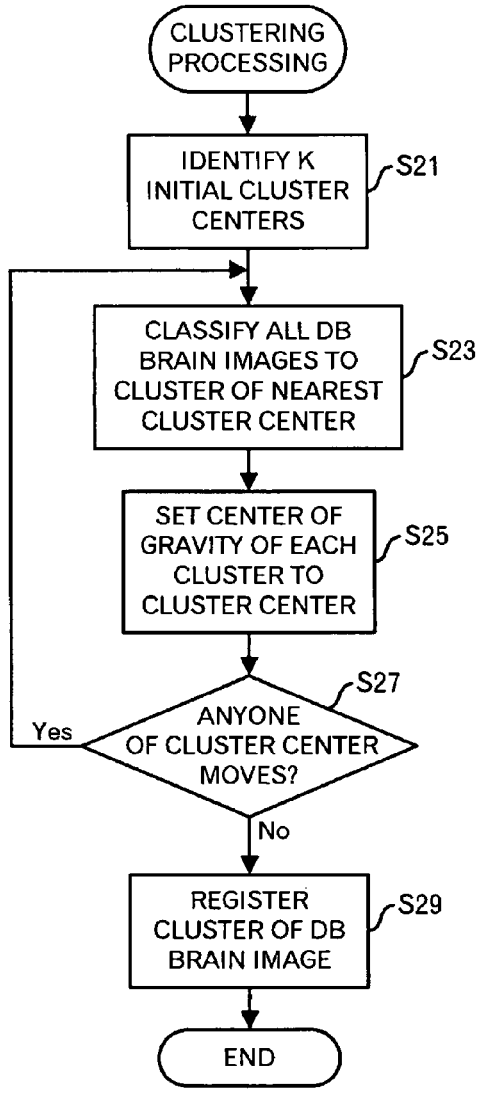
FIG. 8 is a diagram showing a processing of a clustering processing.
FIG. 9 is a diagram showing a data example managed in the brain image DB.

For example, the brain image manager 3 carries out the clustering of the brain images by using the K-means method as shown in FIG. 8 or the like and manages the clustering result in the brain image DB 5. That is, the brain image manager 3 identifies K initial cluster centers (DB brain image corresponding to the cluster center. However, in the following processing, the DB brain image is treated as vector data having a dimension of the number of pixels) (step S21). "K" is preset, and the initial cluster center can be arbitrarily selected. Then, the brain image manager 3 compares all of the DB brain images with the K cluster centers to calculate the degrees of the similarity, and provisionally classifies the respective DB brain images to a cluster of the most nearest cluster center (step S23). The DB brain image to be processed in this step is a DB brain image corresponding to a predetermined test drawing or one drawing to which the most users register the DB brain image. After that, the brain image manager 3 calculates the center of gravity for each cluster, and sets it as the new cluster center (step S25).

Then, the brain image manager 3 judges whether or not either of the cluster centers moves equal to or more than a predetermined reference (step S27). When either of the cluster centers moves equal to or more than the predetermined reference, the processing returns to the step S23. On the other hand, when any of the cluster centers do not move, the brain image manager 3 registers the clusters of the DB brain images into the brain image DB 5 (step S29). The cluster is registered to the DB brain image to be processed at the step S23 according to the classification at the step S23, and the cluster is registered to the DB brain image other than the DB brain image to be processing at the step S23 based on the user ID. Namely, when the user ID of the DB brain image to which the cluster "a" was registered is "A", the cluster "a" is registered to the DB brain image whose user ID is "A". At the step S29, the data as shown in FIG. 9 is registered into the brain image DB 5, for example. That is, the user ID, the brain image ID, the registered drawing ID and the cluster ID are associated and registered.

Figure 10:
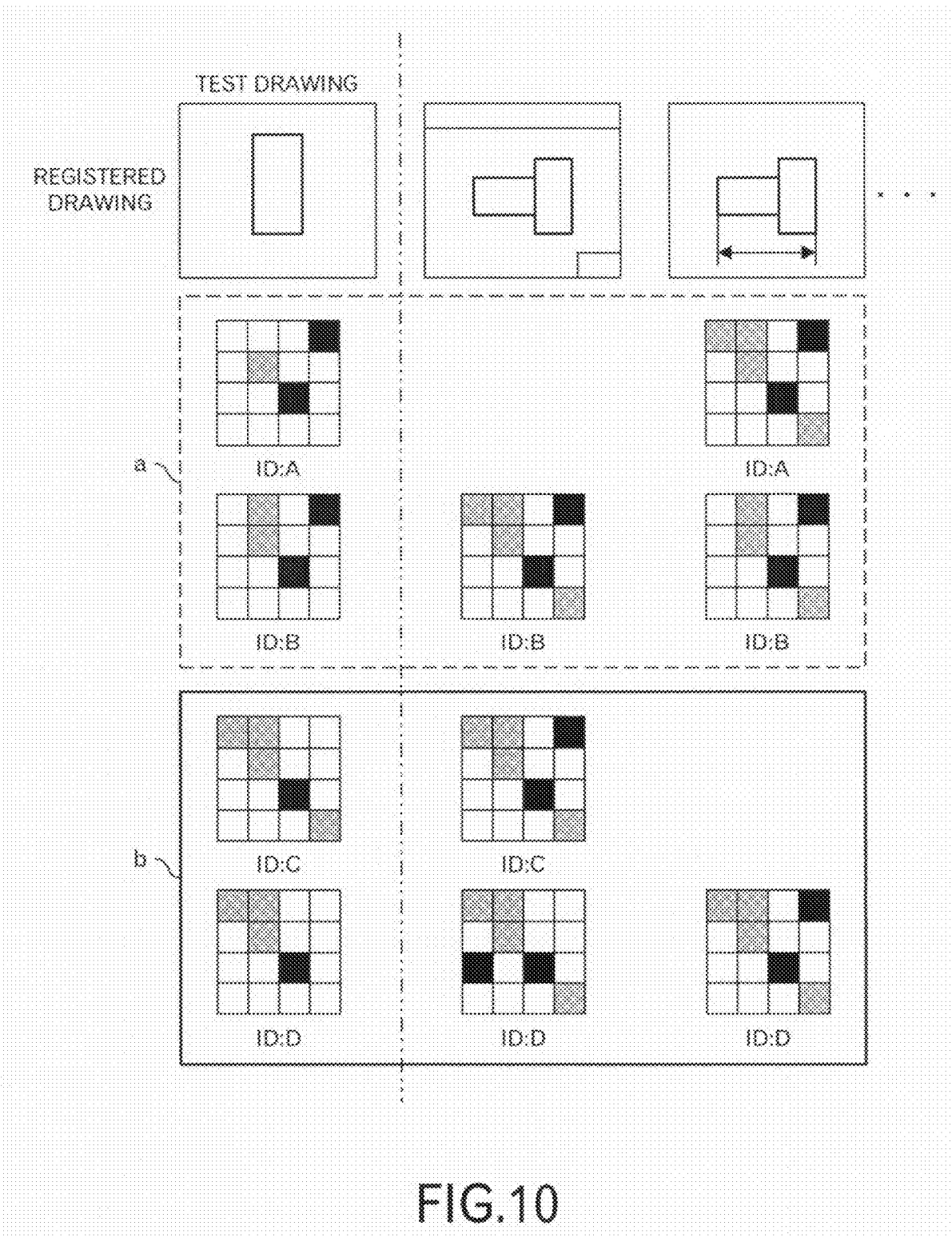
FIG. 10 is a diagram to explain the search processing using the clustering.

A state where such data is managed in the brain image DB 5 is schematically indicated in FIG. 10. In an example of FIG. 10, there are two clusters of clusters "a" and "b", users whose user IDs are "A" and "B" are classified to the cluster "a", users whose user IDs are "C" and "D" are classified to the cluster "b", and the DB brain image corresponding to the registered drawing other than the test drawing is classified to the same cluster as that of the test drawing.

Although the K-means method is adopted for the clustering method, another method can be used for the clustering in this embodiment.

Figure 4:
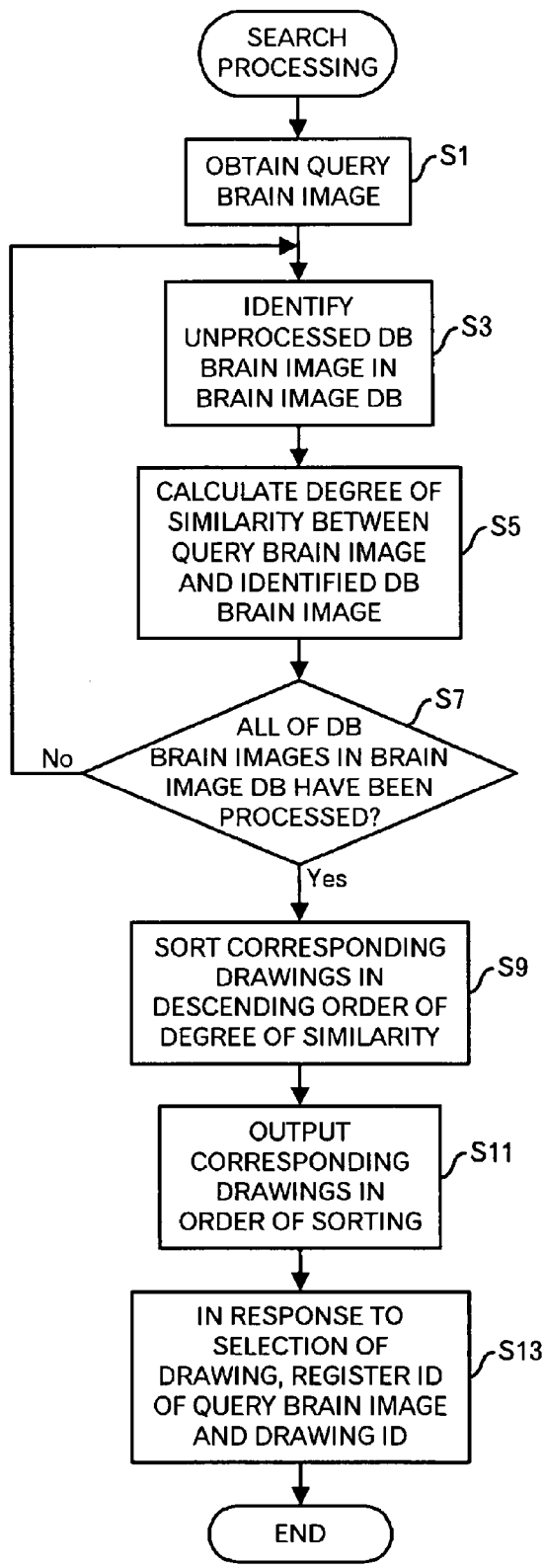
FIG. 4 is a diagram showing a processing flow of a first search processing.
Figures 11, 13:
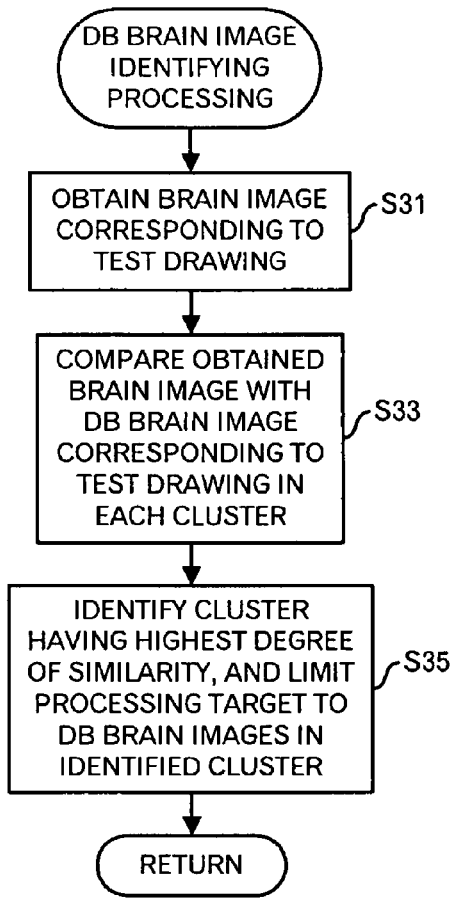
FIG. 11 is a diagram showing a processing flow of a DB brain image identifying processing.
FIG. 13 is a diagram showing a data example managed in a drawing DB when the multiple-component drawing.

When such data is managed in the brain image DB 5, the DB brain images to be compared at the step S3 in FIG. 4 are narrowed as shown in FIG. 11. That is, the brain image input unit 7 presents, for example, the test drawing for the searcher to cause him or her to visually check it, and obtains the brain image corresponding to the test drawing to store the brain image into the brain image storage 8 (step S31). The test drawing may not be used. In such a case, the brain image input unit 7 searches the brain image DB 5 to identify a drawing ID of a drawing to which the most users register the brain image, and reads out the drawing to be used as the test drawing from the drawing DB 1 based on the drawing ID to present the drawing for the searcher.

Next, the search processor 9 compares the obtained brain image with the DB brain image corresponding to the test drawing in each cluster (step S33). That is, the search processor 9 calculates the degree of the similarity between the obtained brain image and the representative DB brain image in each cluster, and stores the degree into the storage device such as the main memory. The calculation of the degree of the similarity is the same as the aforementioned one. Then, the search processor 9 identifies the cluster having the highest degree of the similarity, and limits the processing target to the DB brain images in the cluster (step S35). Namely, for example, in the table as shown in FIG. 9, only the DB brain images to which the cluster ID of the cluster having the highest degree of the similarity is registered are to be processed at the step S5 and the subsequent steps.

Incidentally, by carrying out the clustering again at a predetermined interval or at an arbitrary timing, the clusters are dynamically changed by the brain image manager 3 in order to maintain and manage appropriate clusters.

Thus, because the processing target can be narrowed to the DB brain images of the users having the similar tendency, it becomes possible to obtain an appropriate search result at high speed.

Embodiment 4

Figure 12:
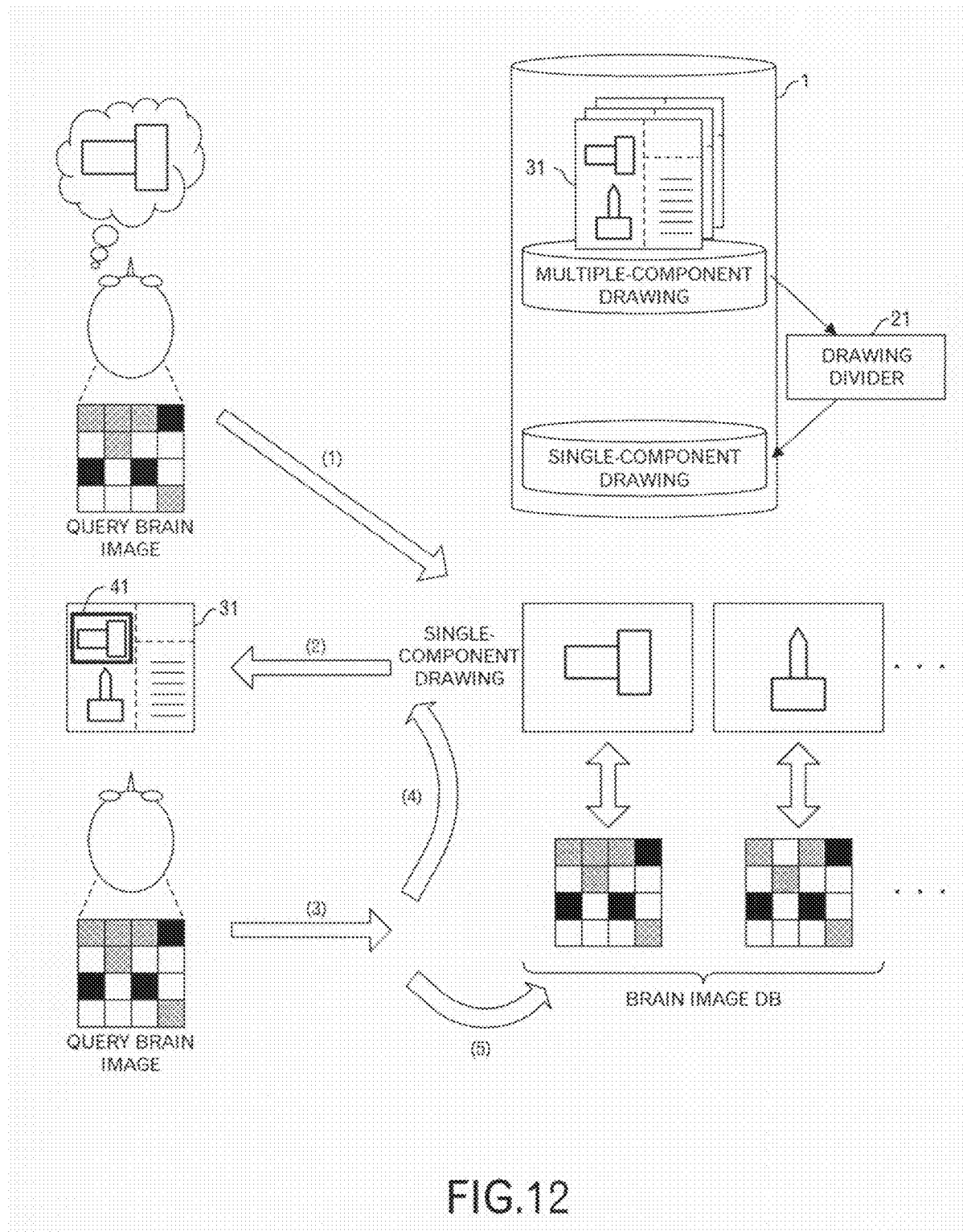
FIG. 12 is a diagram showing an outline of a processing when a multiple-component drawing exists.

As shown in the upper right of FIG. 12, there is a case where a multiple-component drawing in which plural components are drawn is registered in the drawing DB 1. In such a case, by a drawing divider 21 in which a method for automatically dividing the drawing into components (e.g. a technique described in Takayuki Baba et al., "A shape-based part retrieval method for mechanical assembly drawings", the technical study report of the Institute of Electronics, Information and Communication Engineers, PRMU2004-225, pp. 79-84 (2005)) is implemented, the drawing is divided into components. The drawing after the division is called a single-component drawing. The brain image DB 5 stores and manages the DB brain image in association with the single-component drawing. However, as shown in FIG. 13, the drawing DB 1 has to manage the relation between the multiple-component drawing and the single-component drawings. That is, it is necessary to manage the multiple-component drawing ID in association with the single-component IDs.

Figure 14:
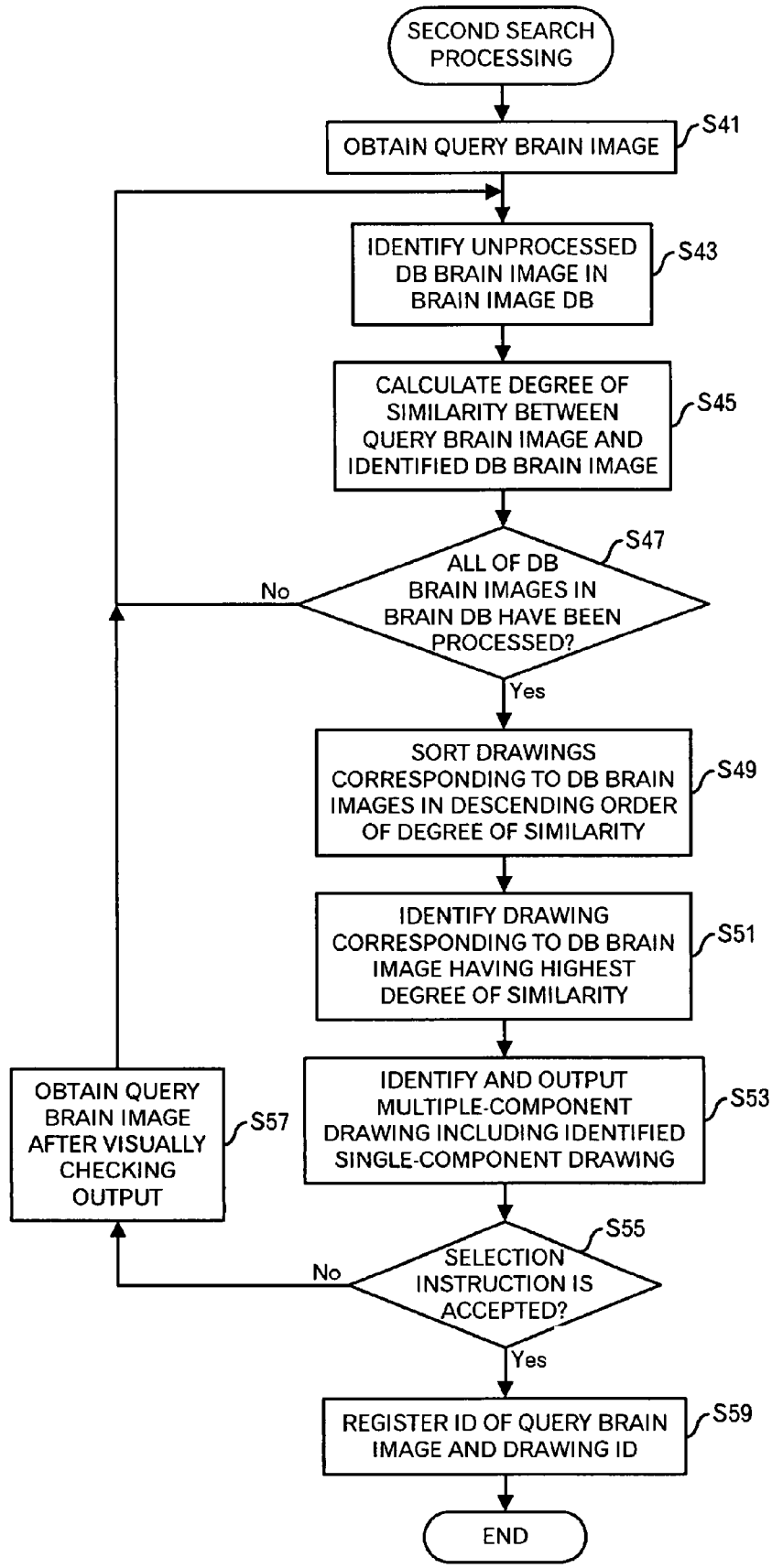
FIG. 14 is a diagram showing a processing flow of a second search processing.

Then, a processing as shown in FIG. 14 is carried out. First, the brain image input unit 7 obtains a query brain image representing the brain activity when the searcher visually checks the drawing to be retrieved or when the searcher imagines the drawing to be retrieved, and stores the query brain image into the brain image storage 8 (step S41). The entire brain image may be used as the query brain image, and only a pre-specified active area may be used as the query brain image. In FIG. 12, as shown by an arrow (1) from the upper left portion, for example, the query brain image is obtained.

Next, the search processor 9 identifies one unprocessed DB brain image in the brain image DB 5 (step S43). Then, the search processor 9 calculates the degree of the similarity between the query brain image and the DB brain image identified at the step S43, and stores the degree into the storage device such as the main memory (step S45). At the step S45, for example, it is possible that the difference between the density of a pixel of the query brain image and the density of a corresponding pixel of the DB brain image is calculated, and the total sum of the absolute values of the differences are calculated as the degree of the similarity. Incidentally, it is also possible that the difference of the pixel density between only portions in both of the query brain image and the DB brain image is calculated.

Moreover, it is also possible that an image feature quantity of the color, shape or the like is extracted from the query brain image to generate a feature quantity vector from the image feature quantity, a image feature quantity of the color, shape or the like is extracted from the DB brain image to generate a feature quantity vector from the image feature quantity, and the distance between these feature quantity vectors is calculated as the degree of the similarity.

Then, the search processor 9 judges whether or not all of the DB brain images in the brain image DB 5 have been processed (step S47). When there is an unprocessed DB brain image, the processing returns to the step S43. On the other hand, when all of the DB brain image in the brain image DB 5 have been processed, the search processor 9 sorts the DB brain images based on the degrees of the similarity in the descending order (step S49). For example, the brain image IDs of the DB brain images are arranged based on the degree of the similarity in the descending order. After that, the search processor 9 identifies the drawing (i.e. the single-component drawing) corresponding to the brain image having the highest degree of the similarity (step S51), extracts the drawing from the drawing DB 1, and stores the drawing into the search result storage 11. Furthermore, the search processor 9 identifies the multiple-component drawing including the single-component drawing identified at the step S51 from the data structure as shown in FIG. 13, extracts the multiple-component drawing from the drawing DB 1, and stores the multiple-component drawing into the search result storage 11. Then, the input and output unit 13 outputs the multiple-component drawing stored in the search result storage 11 after attaching a mark to a portion of the identified single-component drawing (step S53). In the example of FIG. 12, as shown at a tip of an arrow (2), a multiple-component drawing 31 is presented for the user. A mark 41 is attached to a portion of the identified single-component drawing at the step S51 in this multiple-component drawing 31.

Here, the searcher refers to the presented multiple-component drawing 31 and the mark 41 to judge whether or not the target drawing is presented. When the target drawing is not presented, he or she instructs the brain image input unit 7 to input the query brain image again. The brain image input unit 7 accepts the instruction of the re-input of the query brain image (step S55: No route), obtains the query brain image when he or she imagines the drawing to be retrieved again after visually checking the output (i.e. presented content) and stores the query brain image into the brain image storage 8 (step S57). In FIG. 12, a scene where the multiple-component drawing 31 with the mark 41 is referenced and the query brain image is measured again is indicated in the lower left, and the query brain image is input as shown by an arrow (3). Then, the processing returns to the step S43. By carrying out such a processing, the searcher can imagine the drawing more specifically, and the query brain image is measured more appropriately. Then, the adequate drawing can be extracted. In FIG. 12, as shown by an arrow (4), the search is carried out again.

On the other hand, when it is judged that the target drawing is presented, the searcher inputs the selection instruction to the input and output unit 13. When accepting the selection instruction from the searcher (step S55: Yes route), the input and output unit 13 registers the query brain image into the brain image DB 5, and registers the brain image ID of the query brain image and the drawing ID of the corresponding drawing (i.e. simple-component drawing) into the data structure shown in FIG. 3 (step S59). In FIG. 12, as shown by an arrow (5), the query brain image is registered into the brain image DB 5 in order to reuse it.

Even if such a multiple-component drawing is used, it is possible to extract necessary drawings and present them for the searcher.

Incidentally, although a processing example in which the query brain image is obtained again at the step S57 is shown, it is possible to search the drawing DB 1 for drawings similar to the identified single-component drawing, for example, to present them for the searcher.

Embodiment 5

Figure 15:
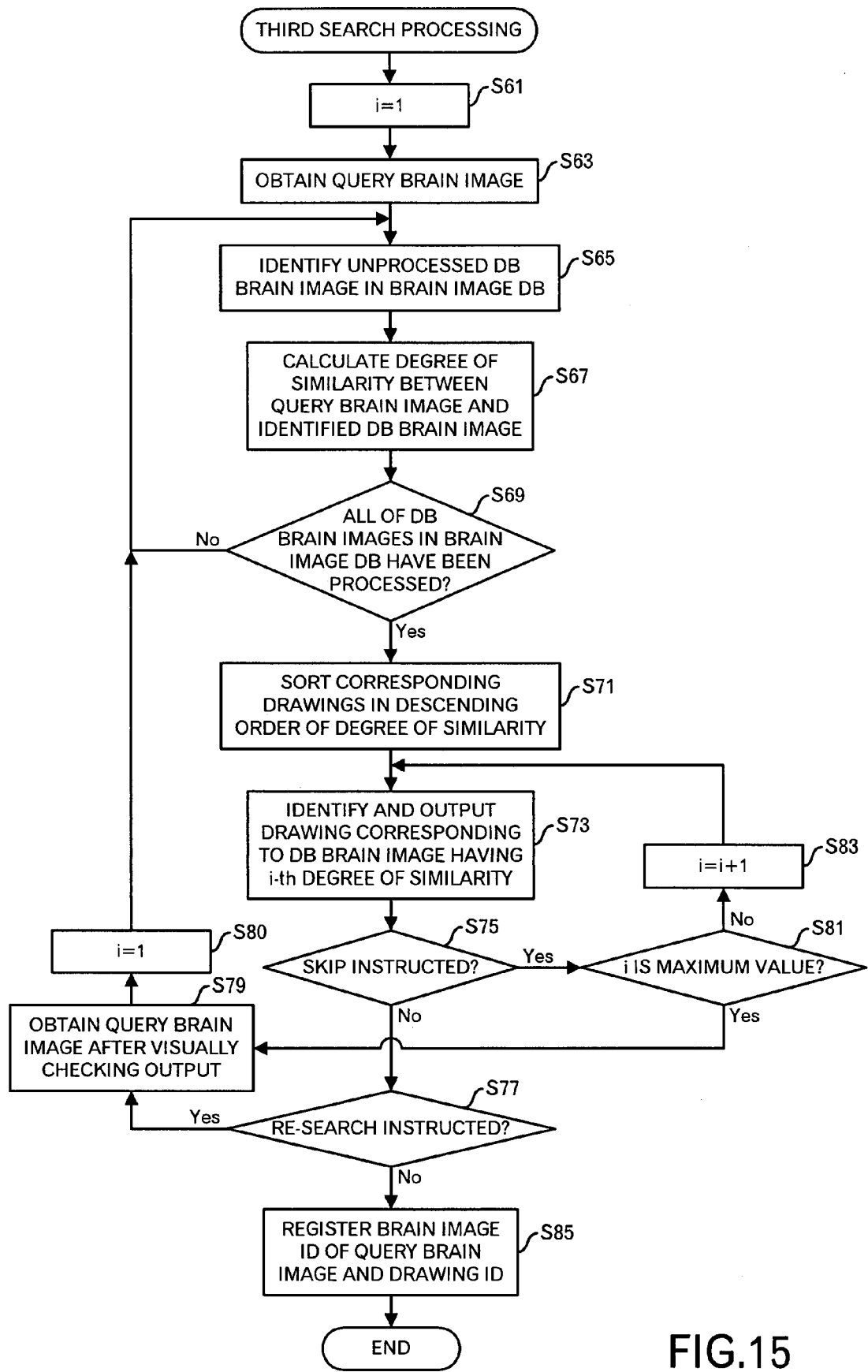
FIG. 15 is a diagram showing a processing flow of a third search processing.

The search processing can be variously changed, and a search processing as shown in FIG. 15 can be adopted, for example.

First, the input and output unit 13 initializes a counter i to "1" (step S61). Then, the brain image input unit 7 obtains a query brain image representing the brain activity when the searcher visually checks the drawing to be retrieved or when the searcher imagines the drawing to be retrieved, and stores the query brain image into the brain image storage 8 (step S63). The entire query brain image may be used, and only a pre-specified active area may be used. When only portion of the query brain image is used, only corresponding portion of the DB brain image is also used.

Next, the search processor 9 identifies one unprocessed DB brain image in the brain image DB 5 (step S65). Then, the search processor 9 calculates the degree of the similarity between the DB brain image identified at the step S65 and the query brain image, and stores the degree of the similarity into the storage device such as the main memory (step S67). At the step S67, it is possible that the difference between the density of a pixel of the query brain image and the density of a corresponding pixel of the DB brain image is calculated, and the total sum of the absolute values of the differences is calculated as the degree of the similarity. Incidentally, the pixel density difference between only portions in both of the query brain image and the DB brain image may be calculated.

In addition, it is possible that the image feature quantity of the color, the shape or the like is extracted from the query brain image to generate a feature quantity vector from the image feature quantity, the image feature quantity of the color, the shape or the like is extracted from the DB brain image to generate a feature quantity vector, and the distance between these feature quantity vectors is calculated as the degree of the similarity.

Then, the search processor 9 judges whether or not all of the DB brain image in the brain image DB 5 have been processed (step S69). When there is an unprocessed DB brain image, the processing returns to the step S65. On the other hand, when all of the DB brain image in the brain image DB 5 have been processed, the search processor 9 sorts the drawings corresponding to the DB brain images by using the data structure shown in FIG. 3 in a descending order of the degree of the similarity of the DB brain images (step S71). The data of the drawings is obtained from the drawing DB 1, and stored with the sorting result (e.g. data shown in FIG. 6) into the search result storage 11. Incidentally, the top predetermined number of drawings, not all of the drawings, may be obtained from the drawing DB 1.

The input and output unit 13 presents the drawing corresponding to the DB brain image having the i-th degree of the similarity for the searcher, based on the sorting result stored in the search result storage 11 (step S73). For example, the screen including a "skip" button, a "select" button, and a "search again" button is displayed. Then, when an appropriate drawing is not displayed, the searcher clicks the "skip" button. When the "skip" is clicked, the input and output unit 13 accepts the skip instruction (step S75: Yes route), and judges whether or not "i" is the maximum value (step S81). When "i" is the maximum value, the processing shifts to a step S79. On the other hand, when "i" is not the maximum value, "i" is incremented (step S83), and the processing returns to the step S73.

On the other hand, when the "skip" button is not clicked (step S75: No route), but the "search again" button is clicked, the brain image input unit 7 accepts the re-search instruction (step S77: Yes route), and obtains a query brain image when the searcher imagines the drawing to be retrieved again after he or she watched the presented content, and stores the query brain image into the brain image storage 8 (step S79). Then, the input and output unit 13 initializes the counter i to "1" (step S80), and the processing returns to the step S65.

In addition, when the drawing the searcher visually checked or imagined is output, the searcher clicks the "select" button. The input and output unit 13 accepts the selection instruction of the drawing (step S77: No route), and outputs the drawing ID of the drawing to the brain image manager 3. Moreover, the input and output unit 13 instructs the search processor 9 to register the query brain image stored in the brain image storage 8 into the brain image DB 5, and the search processor 9 registers the query brain image into the brain image DB 5 in response to the instruction. In addition, the brain image manager 3 registers the drawing ID in association with the ID of the query brain image into the table as shown in FIG. 3, for example (step S85). By carrying out such a processing, the query brain image can be effectively used as the DB brain image after the search.

By carrying out the aforementioned processing, the query brain image can be refined to the image of the searcher step by step.

Embodiment 6

For example, by carrying out a following processing, the relation between the drawing and the brain image can be extracted to register it into the brain image DB 5 as new data.

Figure 16:
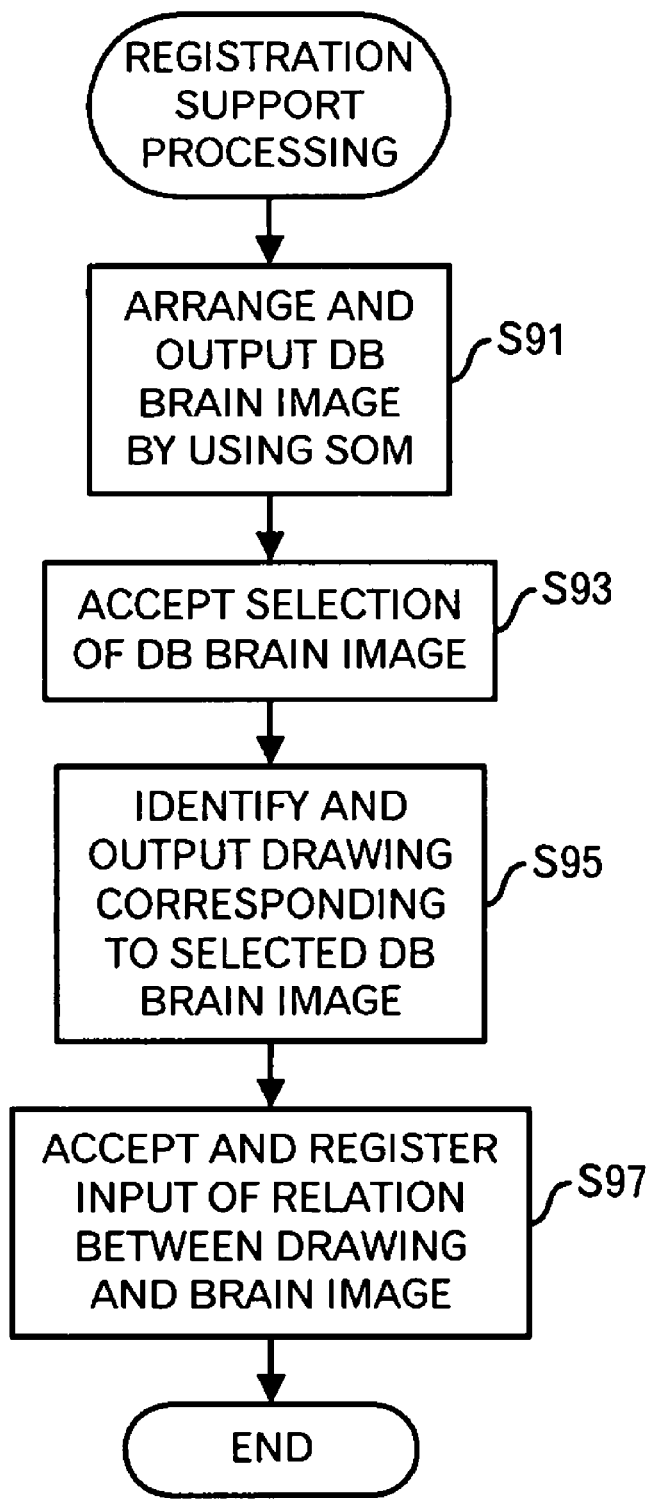
FIG. 16 is a diagram showing a processing flow of a registration support processing.
Figures 17A, 17B:
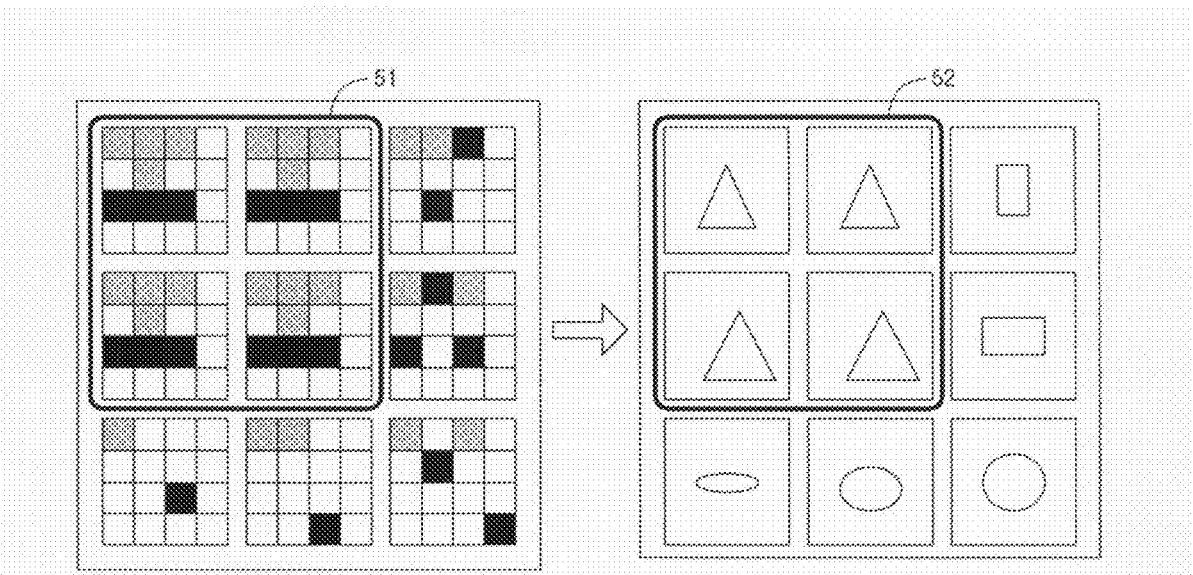
FIGS. 17A to 17C are diagrams to explain the registration support processing.

The brain image manager 3 extracts an image feature quantity of the color, the shape or the like (e.g. an image feature quantity described in Takayuki Baba et al., "A shape-based part retrieval method for mechanical assembly drawings", the technical study report of the Institute of Electronics, Information and Communication Engineers, PRMU2004-225, pp. 79-84 (2005)) from each drawing of the drawing DB 1, and arranges the DB brain images on the two-dimensional plane by using Self Organization Map (SOM) whose input data is the image feature quantity so that the DB brain images corresponding to the drawings having the similar image feature quantity gather nearby. Then, the brain image manager 3 presents the arrangement for the user (FIG. 16: step S91). For example, as shown in FIG. 17A, the DB brain images stored in the brain image DB 5 are arranged two-dimensionally. In the example of FIG. 17A, the DB brain images within a frame 51 are almost the same. At the step S91, SOM is applied using the image feature quantity of the drawing as the input data, for example. However, it is possible to apply SOM using the image feature quantity of the DB brain image to arrange the DB brain image two-dimensionally. Incidentally, the arrangement method using SOM is disclosed in Yusuke Uehara et al., "Computer-aided Knowledge Discovery from Images Based on Information Visualization in a 3-D Virtual Space", Study Material of The Japanese Society for Artificial Intelligence, SIG-FAI/KBS-J-40, pp. 243-250 (2001). However, this is not the main portion of this embodiment. Therefore, further explanation is omitted.

The user selects the DB brain images within the frame 51, for example, from the presented content. Then, the brain image manager 3 accepts the selection of the DB brain images (step S93), identifies the drawings corresponding to the selected DB brain images by using the data structure as shown in FIG. 3, for example, and arranges the drawings in the similar manner with the DB brain image to present the arrangement for the user (step S95). For example, the display as shown in FIG. 17B is carried out. FIG. 17B shows an example in which the drawings corresponding to not only the DB brain image within the frame 51 but also the neighboring DB brain images are arranged and displayed in the same manner. The frame 52 of FIG. 17B corresponds to the frame 51 of FIG. 17A, and almost the same rectangular drawings are arranged. Incidentally, the screens as shown in FIGS. 17A and 17B may be switched but it is preferable that both of them are simultaneously arranged in parallel. Furthermore, they may be displayed in the separate windows.

Figure 17C:
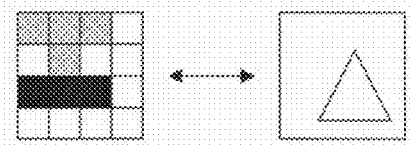

The user refers to the presented content as shown in FIG. 17B, and judges whether or not there is the common rule between the DB brain image and the drawing. In the example of FIG. 17B, the drawings including the similar triangles are grasped in association with the similar DB brain image. Therefore, the relation as shown in FIG. 17C is identified, for example, and the DB brain image and the drawings are selected and input into the brain image manager 3.

The brain image manager 3 accepts the input of the relation between the DB brain image and the drawing, and registers an ID of the DB brain image and an ID of the drawing into the data structure as shown in FIG. 3, for example (step S97).

Thus, the new relation can be registered into the brain image DB 5.

Embodiment 7

In order to reduce the measurement load of the brain image, when there are plural drawings having the extremely high degree of the similarity, only the representative drawing may be visually checked by the user to also assign the brain image to other similar drawings. For example, the brain image manager 3 calculates an image feature quantity for each drawing (e.g. the feature quantity in Takayuki Baba et al., "A shape-based part retrieval method for mechanical assembly drawings", the technical study report of the Institute of Electronics, Information and Communication Engineers, PRMU2004-225, pp. 79-84 (2005)), and registers the image feature quantity into the drawing DB 1. Then, the brain image input unit 7 judges that the degree of the similarity is high when the distance between the calculated image feature quantities is less than a predesignated threshold, presents anyone of the drawings for the user to measure the brain image at that time, and outputs the obtained brain image to the brain image manager 3. The brain image manager 3 registers the data of the brain image measured this time into the brain image DB 5, and registers the drawing ID of the drawing presented for the user and the brain image ID of the brain image measured this time into the data structure shown in FIG. 3. Furthermore, the brain image manager 3 also registers the drawings whose distance between the image feature quantities is less than the predesignated threshold in association with the same brain image ID into the data structure as shown in FIG. 3.

The measurement workload of the brain image is reduced, and the brain image is associated with a lot of drawings.

Embodiment 8

In order to measure the query brain image, the fMRI measurement apparatus is required, for example. Therefore, there is a case where the query brain image cannot be easily obtained. For such a case, instead of the brain image input unit 7, the neural network may be used. The neural network is well known. Therefore, the details are not further explained.

Figure 18A:
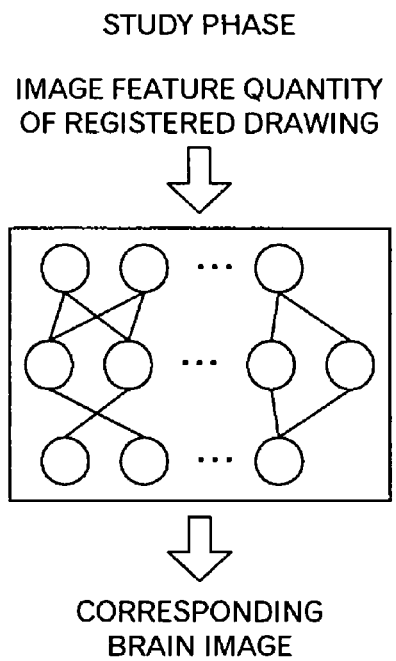
FIGS. 18A and 18B are diagrams showing a first example using the neural network.
Figure 18B:
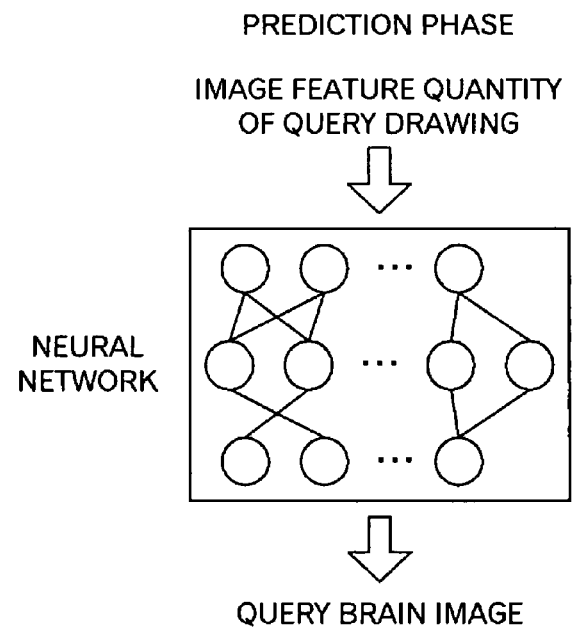

In a case of this embodiment, as shown in FIG. 18A, in the study phase, the study in which the image feature quantity of the registered drawing (e.g. the image feature quantity in Takayuki Baba et al., "A shape-based part retrieval method for mechanical assembly drawings", the technical study report of the Institute of Electronics, Information and Communication Engineers, PRMU2004-225, pp. 79-84 (2005)) is used as the input data and the corresponding brain image is used as the output data is carried out. Then, in the prediction phase at the search, as shown in FIG. 18B, the searcher prepares the query drawing (the drawing to be retrieved or the similar drawing), calculates the image feature quantity of the query drawing, and inputs it into the neural network. Then, the query brain image is output from the neural network, and stored into the brain image storage 8. In the following processing, when the aforementioned processing is carried out, the drawing is extracted.

Embodiment 9

Figure 19A:
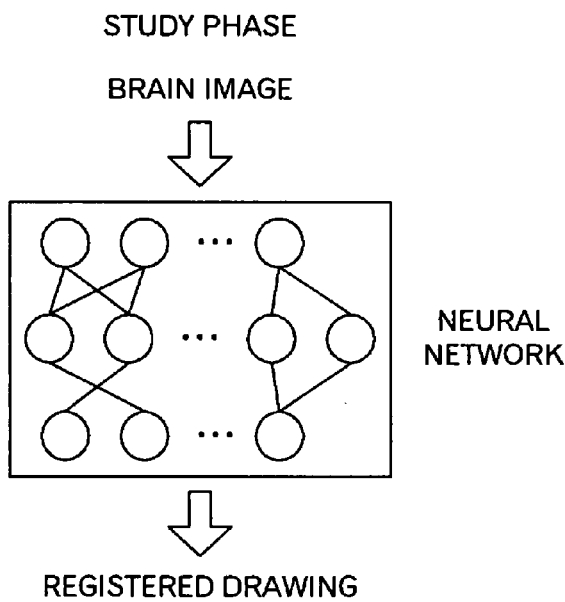
FIGS. 19A and 19B are diagrams showing a second example using the neural network.
Figure 19B:
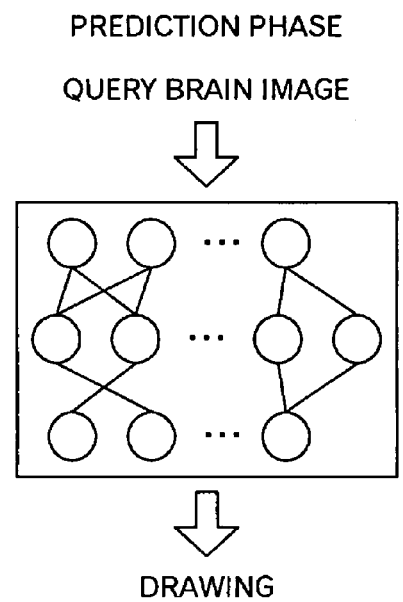

In addition, instead of the search processor 9 and the brain image DB 5, the neural network can be used. That is, as shown in FIG. 19A, in the study phase, the study in which the brain image is used as an input and the corresponding registered drawing is used as an output is carried out. Then, in the prediction phase at the search, as shown in FIG. 19B, when the query brain image is input, the corresponding drawing is output from the neural network.

Thus, by using the neural network, the similar functions can be realized.

Conventionally, an input means should be investigated because there is a problem how embodies, as the query drawing, and efficiently inputs the query content intended by the searcher. By using the aforementioned search apparatus, when the searcher imagines, the brain image can be measured. Therefore, an effect in which the query drawing does not have to be prepared in advance can be obtained.

In addition, in the conventional similar shape search technique, the system developer has to determine the shape feature quantity used in the drawing search in advance, and the drawing search is carried out by using the similarity of the shape feature quantity. On the other hand, in this embodiment, the drawing search is carried out by using the similarity of the brain image measured when the searcher visually checks the drawing. Therefore, the secondary effect in which there is no need to determine the shape feature quantity in advance, and the similarity intended by the searcher can be easily added is realized.

Although the embodiments of this invention were explained, this invention is not limited to these embodiments. For example, the functional block diagram shown in FIG. 2 is a mere example, and the actual module configuration may be different. Furthermore, as for the processing flow, there is a portion in which the steps can be executed in parallel and the order can be exchanged. Moreover, the non-substantial portion can be changed variously.

Figure 20:
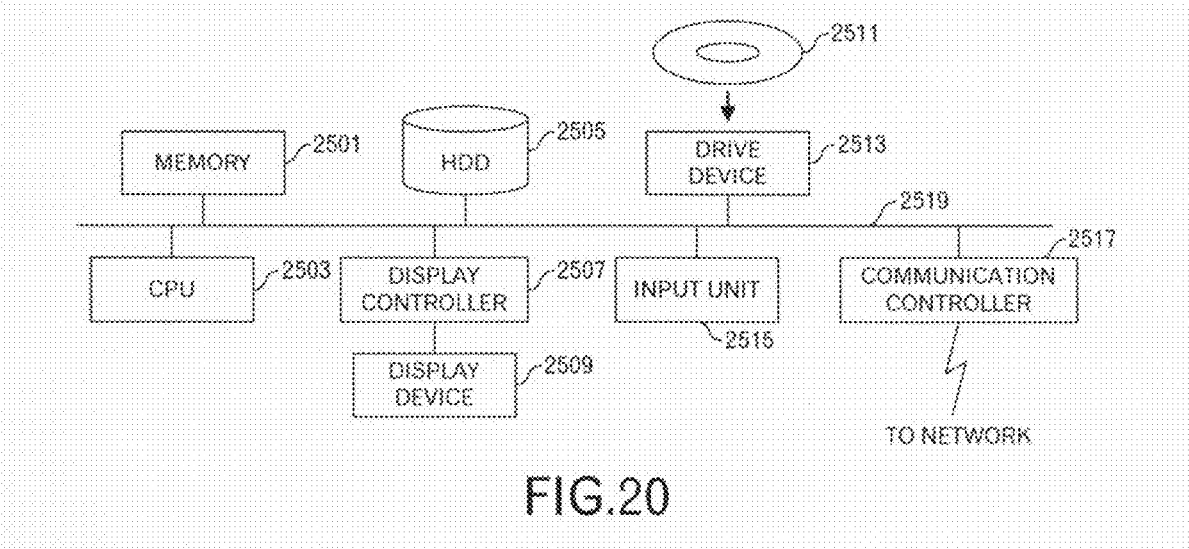
FIG. 20 is a functional block diagram of a computer.

Incidentally, the search apparatus in this embodiment is a computer device as shown in FIG. 20. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 20. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A search program embodied on a non-transitory medium, for retrieving a content human beings can perceive, said program comprising:
   obtaining a query brain image representing a brain activity state of a searcher when perceiving or imagining a content to be retrieved;
   identifying a content corresponding to said query brain image by using a structure associating a brain image representing said brain activity state when perceiving a content with said content; and
   outputting said content corresponding to said query brain image, and
   wherein said structure is a database storing a DB brain image representing said brain activity state when perceiving said content in association with said content, and
   said identifying comprises:
   searching said database by said query brain image to identify a DB brain image having predetermined similarity with said query brain image; and
   identifying a content corresponding to the identified DB brain image from said database.

2. The search program as set forth in claim 1, wherein said predetermined similarity is determined based on a difference between density of a pixel of said DB brain image and density of a corresponding pixel of said query brain image.

3. The search program as set forth in claim 1, wherein said predetermined similarity is determined based on a distance between a feature quantity of said DB brain image and a feature quantity of said query brain image.

4. The search program as set forth in claim 1, wherein a user ID of a user whose DB brain image was measured is associated and registered with said DB brain image in said database, and
   said identifying comprises narrowing said DB brain images by said user ID of said searcher in said database.

5. The search program as set forth in claim 4, wherein said identifying further comprising:
   when said DB brain image having said predetermined similarity cannot be extracted from the narrowed DB brain images, searching said database regardless of said user ID of said searcher or by using a user ID other than said user ID of said searcher.

6. The search program as set forth in claim 1, wherein a user ID of a user whose DB brain image was measured is registered in association with said DB brain image in said database,
   said DB brain images are clustered for each said user ID, and
   each said cluster includes a test registration brain image representing said brain activity state of a pertinent user when perceiving a test content, and
   said search program further comprises:
   obtaining a test brain image representing said brain activity state of said searcher when perceiving said test content; and
   comparing said test brain image with said test registration brain image for each said cluster, which is stored in said database, to identify a cluster to which said test brain image belongs, and
   said identifying comprises:
   narrowing said DB brain images by said cluster to which said test brain image belongs in said database.

7. The search program as set forth in claim 6, further comprising:
   registering, into said database, said test brain image in association with said test content.

8. The search program as set forth in claim 1, further comprising:
   registering, into said database, said query brain image in association with a content identified as a retrieval result for said query brain image.

9. The search program as set forth in claim 1, wherein said content is a single drawing, and
   said search program further comprises:
   identifying, by a data structure managing combinations of a specific drawing that is said content and a drawing including said specific drawing, a combination for a drawing that is said content identified at said identifying, and
   said outputting comprises attaching a mark to said drawing identified at said identifying to output the identified combination.

10. The search program as set forth in claim 1, wherein said identifying further comprises:

sorting said DB brain images having said predetermined similarity with said query brain image in a descending order based on degrees of the similarity of the identified DB brain images, and said outputting comprises:

outputting said content corresponding to said query brain image in an order of said sorting, and said search program further comprises:

obtaining a second query brain image of said searcher at a timing designated by said searcher or at an arbitrary timing; and carrying out said identifying and said outputting for said second query brain image.

11. The search program as set forth in claim 1, wherein said obtaining comprises:

inputting a feature quantity of said content to be retrieved into a neural network in which study is carried out by using a feature quantity of a content as input data and using, as output data, a brain image representing said brain activity state when perceiving said content, to obtain a corresponding brain image.

12. The search program as set forth in claim 1, wherein said structure is a neural network in which study is carried out by using a brain image as input data and using a content corresponding to said brain image as output data.

13. A search apparatus for retrieving a content human beings can perceive, comprising:

an obtaining unit that obtains a query brain image representing a brain activity state of a searcher when perceiving or imagining a content to be retrieved;

an identifying unit that identifies a content corresponding to said query brain image by using a structure associating a brain image representing a brain activity state when perceiving a content with said content; and an output unit that outputs said content corresponding to said query brain image, and wherein said structure is a database storing a DB brain image representing said brain activity state when perceiving a content in association with said content, and said identifying unit searches said database by said query brain image, identifies a DB brain image having predetermined similarity with said query brain image, and identifies a content corresponding to the identified DB brain image from said database.

14. The search apparatus as set forth in claim 13, wherein a user ID of a user whose DB brain image was measured is registered in association with said DB brain image into said database, said DB brain images are clustered for each said user ID, and each said cluster includes a test registration brain image representing said brain activity state of a pertinent user when perceiving a test content, and said search apparatus further comprises:

a unit that identifies, as said test content, a content to which most users register said DB brain image by searching said database or a predetermined content, and said obtaining unit obtains a test brain image representing said brain activity state of said searcher when perceiving said test content, and said identifying unit compares said test brain image with said test registration brain image for each said cluster, which is stored in said database, and identifies a cluster to which said test brain image belongs to narrow said DB brain images by said cluster to which said test brain image belongs in said database.

15. The search apparatus as set forth in claim 14, further comprising:

a unit that dynamically changes said clusters.

16. The search apparatus as set forth in claim 13, further comprising:

a unit that registers, when a plurality of contents having similarity equal to or more than a predetermined reference are detected, one brain image in association with said plurality of contents into said database.

17. The search apparatus as set forth in claim 13, further comprising:

a unit that presents an arrangement of said DB brain images based on feature quantities of corresponding contents for a user;

a unit that presents said corresponding contents in the same arrangement as said arrangement of said DB brain images for said user; and a unit that registers a relation between said contents and said DB brain images, which are specified by said user, into said database.

18. The search apparatus as set forth in claim 13, further comprising:

a unit that presents an arrangement of said DB brain images based on feature quantities of said DB brain images for a user;

a unit that presents corresponding contents in the same arrangement as said arrangement of said DB brain images for said user; and a unit that registers a relation between said corresponding contents and said DB brain images, which are specified by said user, into said database.

* * * * *